US012780662B2

(12) United States Patent
Perng et al.

(10) Patent No.: US 12,780,662 B2
(45) Date of Patent: Nov. 3, 2026

(54) POROUS CARBON MATERIAL AND MANUFACTURING METHOD THEREOF AND POROUS GRAPHITE MATERIAL AND MANUFACTURING METHOD THEREOF

(71) Applicant: National Tsing Hua University, Hsinchu (TW)

(72) Inventors: Tsong-Pyng Perng, Hsinchu (TW); Tzu-Kang Chin, Hsinchu (TW); Ming-Wei Liao, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 908 days.

(21) Appl. No.: 17/879,214

(22) Filed: Aug. 2, 2022

(65) Prior Publication Data

US 2023/0264959 A1 Aug. 24, 2023

(30) Foreign Application Priority Data

Feb. 22, 2022 (TW) .................................. 111106279

(51) Int. Cl.

*C01B 32/15* (2017.01)
*C01B 32/20* (2017.01)
*C01B 32/205* (2017.01)

(52) U.S. Cl.

CPC .............. *C01B 32/15* (2017.08); *C01B 32/20* (2017.08); *C01B 32/205* (2017.08);
(Continued)

(58) Field of Classification Search

CPC ....... C01B 32/05; C01B 32/15; C01B 32/205; C01B 32/20; C01B 32/30; C01B 32/318;
(Continued)

(56) References Cited

U.S. PATENT DOCUMENTS 10,450,652 B2 * 10/2019 Liu .......................... C01B 32/90
2014/0154941 A1 6/2014 Zhamu et al.

FOREIGN PATENT DOCUMENTS

CN 1809516 A 7/2006
CN 102856611 A * 1/2013
(Continued)

OTHER PUBLICATIONS

Yue, Ying, et al. "A mesoporous carbon nanofiber-modified pyrolytic graphite electrode used for the simultaneous determination of dopamine, uric acid, and ascorbic acid." Carbon 50.1 (2012): 107-114.*

(Continued)

*Primary Examiner* — Richard M Rump
(74) *Attorney, Agent, or Firm* — Lippes Mathias LLP

(57) ABSTRACT

A manufacturing method of a porous carbon material includes the following steps. A polymer template is provided, the polymer template includes a polymer compound, and the polymer template has a plurality of pores. A coating step is performed, wherein a metal compound is coated on the polymer template to form a transition intermediate. A heating step is performed, wherein the transition intermediate is heated to transform the polymer template to a carbon template and transform the metal compound to a coating layer, and a porous carbon composite material is formed. A removing step is performed, wherein the coating layer is removed from the porous carbon composite material, and a porous carbon material is obtained.

12 Claims, 10 Drawing Sheets

100

(52) U.S. Cl.
CPC ...... *C01P 2002/72* (2013.01); *C01P 2004/03* (2013.01); *C01P 2006/17* (2013.01)

(58) Field of Classification Search
CPC .............. C01P 2002/72; C01P 2004/03; C01P 2006/17
See application file for complete search history.

(56) References Cited

FOREIGN PATENT DOCUMENTS

| | | | | | |
|---|---|---|---|---|---|
| CN | 103706407 A | | 4/2014 | | |
| CN | 104372525 A | | 2/2015 | | |
| CN | 107221454 A | * | 9/2017 | ............ | H01G 11/84 |
| CN | 108342714 A | | 7/2018 | | |
| CN | 110734052 A | | 1/2020 | | |
| CN | 111088562 A | | 5/2020 | | |
| CN | 113023726 A | * | 6/2021 | ............ | C01B 32/05 |
| CN | 113680341 A | | 11/2021 | | |
| EP | 3246436 A1 | | 11/2017 | | |
| KR | 100717575 B1 | | 5/2007 | | |
| TW | 201325720 A | | 7/2013 | | |
| TW | I518718 B | | 1/2016 | | |
| TW | 202200691 A | | 1/2022 | | |

OTHER PUBLICATIONS

Zhou, Yongsheng, et al. "A nitrogen-doped 3D open-structured graphite nanofiber matrix for high-performance supercapacitors." Journal of Materials Chemistry A 6.29 (2018): 14065-14068.*

Chen, Juan. Manufacturing polyacrylonitrile nanowires and nanofibers for sensing and energy storage applications. Diss. Louisiana Tech University, 2016.*

Meng, Yan, et al. "A family of highly ordered mesoporous polymer resin and carbon structures from organic-organic self-assembly." Chemistry of materials 18.18 (2006): 4447-4464.*

Ramos, Alberto, Ignacio Camean, and Ana B. García. "Graphitization thermal treatment of carbon nanofibers." Carbon 59 (2013): 2-32.*

Jiang, Zhao, et al. "3D self-bonded porous graphite fiber monolith for phase change material composite with high thermal conductivity." Chemical Engineering Journal 438 (2022): 135496.*

Huang, Yang, et al. "Flexible cathodes and multifunctional interlayers based on carbonized bacterial cellulose for high-performance lithium-sulfur batteries." Journal of Materials Chemistry A 3.20 (2015): 10910-10918.*

Hierachical Porosity <https://lifestyle.sustainability-directory.com/area/hierarchical-porosity/#:~: text=Meaning,the%20EPA%27s%20Food%20Recovery%20Hierarchy?> (2024) Accessed Feb. 17, 2026.*

Karuppanan, Karthikeyan K., et al. "Tailored hollow core/mesoporous shell carbon nanofibers as highly efficient and durable cathode catalyst supports for polymer electrolyte fuel cells." ChemElectroChem 6.7 (2019): 2029-2042.*

Liu, Chuanyong, et al. "Carbon hollow fibers with tunable hierarchical structure as self-standing supercapacitor electrode." Chemical Engineering Journal 431 (2022): 134099.*

English machine translation of CN-102856611-A (2013).*

Song, Yu, et al. "Three-dimensional carbon architectures for electrochemical capacitors." Journal of colloid and interface science 509 (2018): 529-545.*

Yang, Song, et al. "Biomass derived interconnected hierarchical micro-meso-macro-porous carbon with ultrahigh capacitance for supercapacitors." Carbon 147 (2019): 540-549.*

Zhifei Mao et al., "A12O3-Assisted Confinement Synthesis of Oxide/Carbon Hollow Composite Nanofibers and Application in Metal-Ion Capacitors", Small, published on Jul. 9, 2020, vol. 16, Issue 33, p. 1-9, published by Wiley-VCH Verlag Gmbh & Co. KGaA, Germany.

Lijun Ji et al., "Synthesis of carbon- and nitrogen-doped TiO2/carbon composite fibers by a surface-hydrolyzed PAN fiber and their photocatalytic property", Journal of Materials Science, published on Oct. 16, 2019, vol. 55, pp. 2471-2481, published by Springer Science+Business Media, Germany.

Luis Zuniga et al., "Multichannel hollow structure for improved Electrochemical performance of TiO2/Carbon composite nanofibers as anodes for lithium ion batteries", Journal of Alloys and Compounds, published on Jun. 11, 2016, vol. 686, pp. 733-743, published by Elsevier B.V., Netherlands.

Cassandra George et al., "Understanding Pore Formation in ALD Alumina Overcoats", ACS Applied Materials & Interfaces, published on Apr. 15, 2020, vol. 12, issue 18, pp. 20331-20343, published by American Chemical Society, United States.

Imre Miklens Sziliegyi et al., "Review on one-dimensional nanostructures prepared by electrospinning and atomic layer deposition", Journal of Physics: Conference Series, published on Nov. 24, 2024, vol. 559, issue 1, pp. 1-13, published by IOP Publishing, England.

Tsong-Pyng Perng et al., "Development of Second Generation Forced Flow Atomic Layer Deposition System and Its Application in Fabricating 3d Nanostructured Solar Energy Devices (3/3)", Final report of MOST(Ministry of Science and Technology)-Granted Research Project, dated on Sep. 15, 2018, implemented by Department of Materials Science and Engineering, National Tsing Hua University, Taiwan, R.O.C.

* cited by examiner

6 µm

| Element | Atomic% |
|---|---|
| C | 63.00 |
| O | 19.30 |
| S | 1.86 |
| Zn | 15.84 |
| total | 100 |

60 µm

| Element | Atomic% |
|---|---|
| C | 89.61 |
| O | 8.66 |
| S | 1.44 |
| Cl | 0.29 |
| total | 100 |

60 µm

60 µm

60 µm

POROUS CARBON MATERIAL AND MANUFACTURING METHOD THEREOF AND POROUS GRAPHITE MATERIAL AND MANUFACTURING METHOD THEREOF

RELATED APPLICATIONS

This application claims priority to Taiwan Application Serial Number 111106279, filed Feb. 22, 2022, which is herein incorporated by reference.

BACKGROUND

Technical Field

The present disclosure relates to a porous carbon material and a manufacturing method thereof and a porous graphite material and a manufacturing method thereof. More particularly, the present disclosure relates to a porous carbon material maintaining original structure of the polymer template thereof and a manufacturing method thereof, and a porous graphite material maintaining original structure of the porous carbon material thereof and a manufacturing method thereof.

Description of Related Art

The commercial porous polymer materials have high separation performance for gas and liquid and are widely used in gas separation and hemodialysis, and can be made into a hollow fiber. However, the application of polymer materials is limited due to their inability to withstand high temperatures and harsh operating environments. In general, for the carbon material made from the polymer material, the electrospinning or phase change wet spinning technology is currently used. In abovementioned technologies, the polymer precursor is made into hollow fiber, which is then sintered and made into carbon hollow fiber. However, during the sintering process, the heating conditions should be precisely controlled, and the selection of polymer precursors is also limited. Further, the microstructure of the final product of carbon hollow fiber is very different from that of the original polymer material, so that the final product of carbon hollow fiber cannot be used for the more precise applications. Moreover, the above carbon material made from polymer material is more difficult to withstand higher temperatures and cannot be further made into graphite material.

Therefore, to improve the manufacturing method of porous carbon material so that the original structure of the polymer material can be maintained at macroscopic and microscopic scales after sintering and carbonization has become the goal of related academia and industry.

SUMMARY

According to one aspect of the present disclosure, a manufacturing method of a porous carbon material includes the following steps. A polymer template is provided, the polymer template includes a polymer compound, and the polymer template has a plurality of pores. A coating step is performed, wherein a metal compound is coated on the polymer template to form a transition intermediate. A heating step is performed, wherein the transition intermediate is heated to transform the polymer template to a carbon template and transform the metal compound to a coating layer, and a porous carbon composite material is formed. A removing step is performed, wherein the coating layer is removed from the porous carbon composite material, and a porous carbon material is obtained.

According to another aspect of the present disclosure, a porous carbon material manufactured by the abovementioned manufacturing method of the porous carbon material has a plurality of mesopores, and a diameter of each of the mesopores is 2 nm to 50 nm.

According to further another aspect of the present disclosure, a manufacturing method of a porous graphite material includes the following steps. The porous carbon material according to the abovementioned aspect of the present disclosure is provided. A graphitizing step is performed, wherein the porous carbon material is heated to a graphitization temperature to obtain a porous graphite material.

According to further another aspect of the present disclosure, a porous graphite material manufactured by the abovementioned manufacturing method of the porous graphite material has a plurality of mesopores, and a diameter of each of the mesopores is 2 nm to 50 nm.

BRIEF DESCRIPTION OF THE DRAWINGS

The present disclosure can be more fully understood by reading the following detailed description of the embodiment, with reference made to the accompanied drawings as follows.

DETAILED DESCRIPTION

Figure 1:
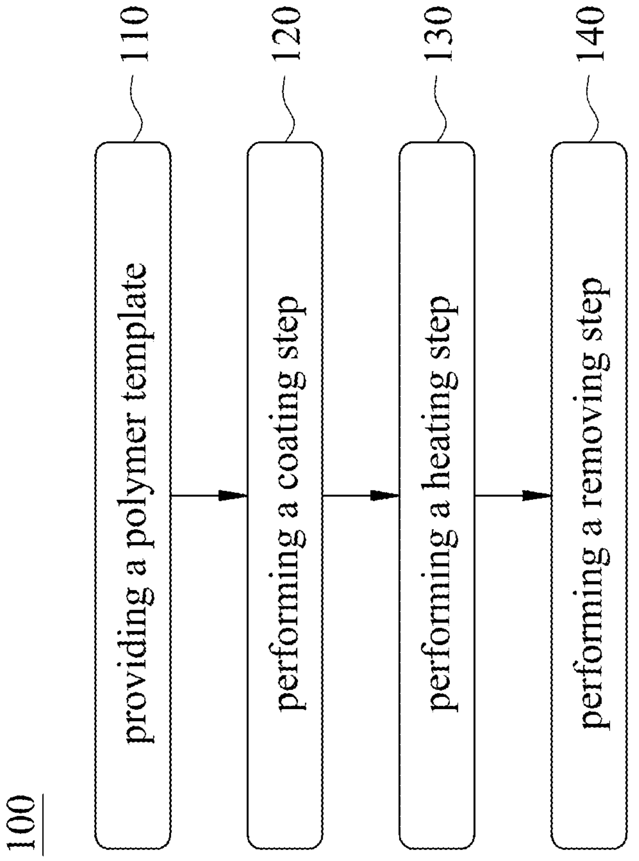
FIG. 1 is a flow chart of a manufacturing method of a porous carbon material according to one embodiment of the present disclosure.

Please refer to FIG. 1. FIG. 1 is a flow chart of a manufacturing method of a porous carbon material 100 according to one embodiment of the present disclosure. The manufacturing method of the porous carbon material 100 includes steps 110, 120, 130 and 140. Each step is further described as follows.

In the step 110, a polymer template is provided. The polymer template includes a polymer compound, and the polymer template has a plurality of pores. In detail, the polymer template has an interconnected structure (shown in FIG. 4A). The interconnected structure forms a plurality of pores, and the polymer template has mesoporous property. Specifically, the polymer compound can be polyacrylonitrile (PAN), polyimide (PI), cellulose, polysulfone (PSF) or other organic material that can be carbonized, and the present disclosure will not be limited thereto.

In the step 120, a coating step is performed. A metal compound is coated on the polymer template to form a transition intermediate. In the coating step, an atomic layer deposition (ALD) method or a sol-gel method can be used to coat the metal compound on the polymer template. Therefore, the metal compound can be coated more uniformly and completely on the polymer template and its interconnected structure. Further, it is beneficial to maintain the structural integrity of the structure of the polymer template and its interconnected structure.

Specifically, the metal compound can be a metal oxide. For example, the metal oxide can be $MnO_2$, $ZrO_2$, $WO_3$, $HfO_2$, $Ta_2O_5$, $VO_2$, $NbO_2$, $Cr_2O_3$, $MoO_3$, $CeO_2$, ZnO, $TiO_2$, $Al_2O_3$, $SiO_2$, CuO, NiO, $Fe_2O_3$, CoO, $SnO_2$, $Ga_2O_3$, $GeO_2$ or a combination of the above, and the present disclosure will not be limited thereto.

If the step 120 is performed as the atomic layer deposition method, the precursor of metal is utilized to attach to the polymer template at first. An inert gas is utilized to remove the unreacted precursor. A second precursor of oxygen is then introduced to react with the metal precursor on the polymer surface to form a monolayer of metal oxide. A second purge with an inert gas is then made to remove the unreacted precursor and byproducts. The above process is called as a cycle, and each cycle only forms a thin film having a thickness of an atomic layer. Accordingly, a thickness of the metal compound coated on the polymer template can be controlled by the cycle number of the atomic layer deposition of the coating step. Specifically, in the manufacturing method of the porous carbon material 100 of the present disclosure, the coating step can be repeated 1 to 2000 times. Preferably, the coating step can be repeated 50 to 2000 times so as to obtain a sufficient thickness. The thickness of the metal compound coated on the polymer template can be 1 Å to 2000 Å, preferably, the thickness of the metal compound coated on the polymer template can be 50 Å to 2000 Å so as to form a sufficient thickness.

In the step 130, a heating step is performed. The transition intermediate is heated to carbonize the polymer compound therein and transform the polymer template to a carbon template and transform the metal compound to a coating layer, and the porous carbon composite material is obtained. The porous carbon composite material can be a hierarchical structure. In detail, the heating step can be performed under an ammonia atmosphere or an inert gas atmosphere. The heating step has a heating temperature, and the heating temperature can be 500° C. to 1000° C. The transition intermediate can be heated at a heating rate which can be 1° C./min to 50° C./min, and the heating step can be performed for 0.5 hours to 72 hours. Specifically, the operating conditions of the heating step can be determined depending on the properties of the metal compound and the polymer template and the degree of carbonization of the polymer template, and the present disclosure will not be limited therein.

In the step 140, a removing step is performed. The coating layer is removed from the porous carbon composite material, and the porous carbon material is obtained. In detail, in the removing step, the porous carbon composite material can be immersed in a solution to remove the coating layer, wherein the solution can be NaOH, KOH, $H_3PO_4$, HCl, $HNO_3$, HF or $H_2SO_4$, and it can be selected according to the characteristics of the coating layer, the present disclosure will not be limited. Specifically, in the step 140, the coating layer is removed from the porous carbon composite material without damaging the structure of the porous carbon material, so that the structural integrity of the porous carbon material can be maintained.

By the operation of the manufacturing method of the porous carbon material 100 described above, a porous carbon material can be finally obtained. The porous carbon material has a plurality of mesopores, and the diameter of each of the mesopores is 2 nm to 50 nm. In detail, the porous carbon material has an interconnected structure (as shown in FIG. 3C), and the interconnected structure forms the plurality of mesopores.

Specifically, the porous carbon material of the present disclosure can be a hollow fiber structure or an aerographite structure. The hollow fiber has high separation performance for gas and liquid and can be widely used in gas separation and hemodialysis. The aerographite has multiple applications, such as energy storage, catalysis, gas storage, wastewater treatment, heat resistance, and other functions and applications. By applying the manufacturing method of the porous carbon material 100 of the present disclosure, the performance of the abovementioned application can be improved, and the application thereof can be wider.

In the manufacturing method of the porous carbon material 100, the metal compound is uniformly coated on the polymer template and its interconnected structure, so that the deformation of the polymer compound of the polymer template turning into the carbon is limited, and it is beneficial to maintain the structural integrity of the porous carbon material and interconnected structure. In detail, the coating of the metal compound prevents the structure of the polymer template from being damaged during the carbonization process of the heating step, and the structural geometry of the porous carbon material and the interconnected structure can be consistent with the structural geometry of the polymer template and its interconnected structure. In this way, the macroscopic and microscopic structures of the porous carbon material can be controlled by the original structure of the polymer template, and the geometry and the structure of the porous carbon material can be controlled more accurately and precisely.

In the conventional manufacturing method of the porous carbon material, the electrospinning or phase change wet spinning technology is used. In the abovementioned technologies, the polymer precursor is mixed with other substances, processing into a predetermined structure, such as hollow fibers, and then sintered it into the porous carbon material. However, during the sintering process, in order to maintain the structural integrity of the pores, the heating conditions must be precisely controlled, and the selection of polymer precursors is also limited. The structure of the final product is very different from the structure of the original polymer material, the product cannot meet the more precise needs, and its application will be limited. Compared with the conventional method, in the manufacturing method of the porous carbon material 100 of the present disclosure, it can heat up and carbonize faster, and the process time can be reduced. Further, the structure of the porous carbon material can still maintain the same as the original structure of the polymer template. Therefore, the macroscopic and microscopic structure of the porous carbon material of the present disclosure can be controlled more precisely, and the requirements of more precise application can be achieved.

Figure 2:
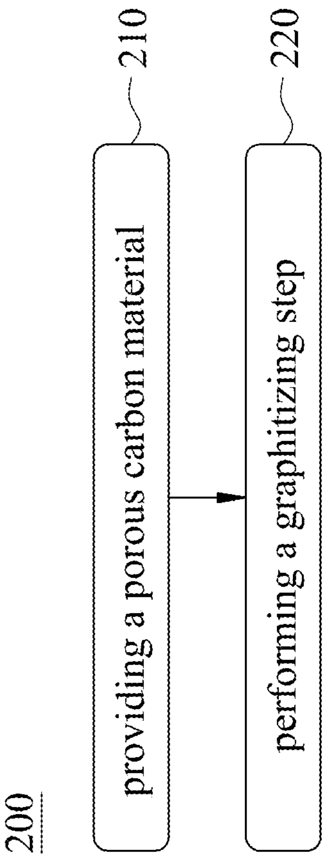
FIG. 2 is a flow chart of a manufacturing method of a porous graphite material according to another embodiment of the present disclosure.

Please refer to FIG. 2. FIG. 2 is a flow chart of a manufacturing method of a porous graphite material 200 according to another embodiment of the present disclosure. The manufacturing method of the porous graphite material 200 includes steps 210 and 220.

In the step 210, the porous carbon material manufactured by the manufacturing method of the porous carbon material 100 of FIG. 1 is provided. The details of the manufacturing method of the porous carbon material 100 are as described above, and will not be repeated herein.

In the step 220, the graphitizing step is performed. The porous carbon material is heated to a graphitization temperature to obtain a porous graphite material. The graphitization temperature can be 1600° C. to 3000° C., and the porous carbon material can be heated at a rate of 1° C./min to 2° C./min. Thus, the carbon of the porous carbon material can be transformed to the graphite.

The porous graphite material manufactured by the manufacturing method of the porous graphite material 200 has a plurality of mesopores, and the diameter of each of the mesopores is 2 nm to 50 nm. Further, the porous graphite material can be a hollow fiber structure or an aerographite structure.

In the manufacturing method of the porous graphite material 200, the structure of the porous graphite material may not be destroyed and can be well maintained in geometry similar to the structure of the polymer template before heating. Therefore, the macroscopic and microscopic structures of the porous graphite material can be effectively controlled, and the porous graphite material can be applied in the field requiring higher precision. It is worth mentioning that the porous graphite material has the characteristics of high electrical conductivity and corrosion resistance, and can be used in the fields such as electrical contacts, electrocatalysis and chemical separation.

Reference will now be made in detail to the present embodiments of the present disclosure, examples of which are illustrated in the accompanied drawings.

Examples

In order to more carefully illustrate the advantages of the manufacturing method of the porous carbon material 100 and the manufacturing method of the porous graphite material 200 of the present disclosure, Example 1, Example 2, Example 3, Example 4 and Example 5 are presented in the following. Examples 1-3 are porous carbon materials manufactured by the manufacturing method of the porous carbon material 100. Examples 4-5 are porous graphite materials manufactured by the manufacturing method of the porous graphite material 200. The actual manufacturing method of each embodiment will be described below.

In the preparation of Example 1, the polymer compound of the polymer template used in Example 1 is polysulfone, and the metal compound used in Example 1 is aluminum oxide ($Al_2O_3$). The atomic layer deposition method is used to coat the aluminum oxide on the polysulfone and is repeated for 200 times. The heating step is performed under an argon atmosphere, and the heating temperature is 800° C. to carbonize the polysulfone. The aluminum oxide is converted into γ-crystalline phase, and the porous carbon composite material is formed. Then, the porous carbon composite material is immersed in NaOH solution to remove the aluminum oxide, and Example 1 is finally obtained.

In the preparation of Example 2, the polymer compound of the polymer template used in Example 2 is polysulfone, and the metal compound used in Example 2 is zinc oxide (ZnO). The atomic layer deposition method is used to coat the zinc oxide on the polysulfone. The heating step is performed under an argon atmosphere, and the heating temperature is 800° C. to carbonize the polysulfone so as to form the porous carbon composite material. Then, the porous carbon composite material is immersed in HCl solution to remove the zinc oxide, and Example 2 is finally obtained.

In the preparation of Example 3, the polymer compound of the polymer template used in Example 3 is polysulfone, and the metal compound used in Example 3 is titanium oxide ($TiO_2$). The coating step can be performed by sol-gel method. The titanium oxide can be coated on polysulfone through the sol-gel method by titanium isopropoxide (TTIP). The heating step is performed under an argon atmosphere, and the heating temperature is 800° C. to carbonize the polysulfone so as to form the porous carbon composite material. Then, the porous carbon composite material is immersed in $H_2SO_4$ solution to remove the titanium oxide, and Example 3 is finally obtained.

In the preparation of Example 4, the porous carbon material of Example 1 is provided and heated to 2700° C. to transform the carbon in the porous carbon material into graphite, so as to obtain the porous graphite material of Example 4.

In the preparation of Example 5, the polymer compound of the polymer template used in Example 5 is polyimide (PI), and the metal compound used in Example 5 is aluminum oxide ($Al_2O_3$). The atomic layer deposition method is used to coat the aluminum oxide on the polyimide. The heating step is performed under an argon atmosphere, and the heating temperature is 800° C. to carbonize the polyimide. The aluminum oxide is converted into γ-crystalline phase, and the porous carbon composite material is formed. The porous carbon composite material is immersed in NaOH solution to remove the aluminum oxide so as to form the porous carbon material. Then, the porous carbon material is heated to 2700° C. to transform the carbon in the porous carbon material into graphite, so as to obtain the porous graphite material of Example 5.

Figure 3A:
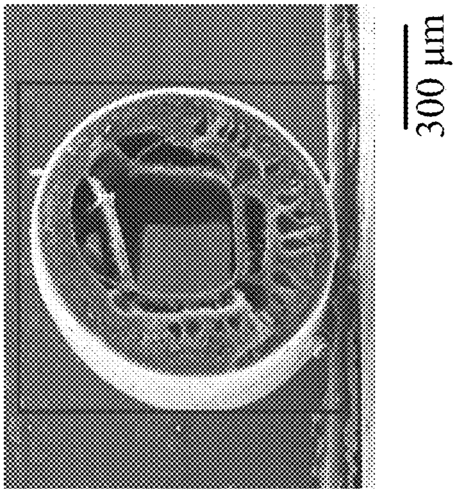
FIG. 3A is an SEM image of Example 1 of the present disclosure.
Figure 3B:
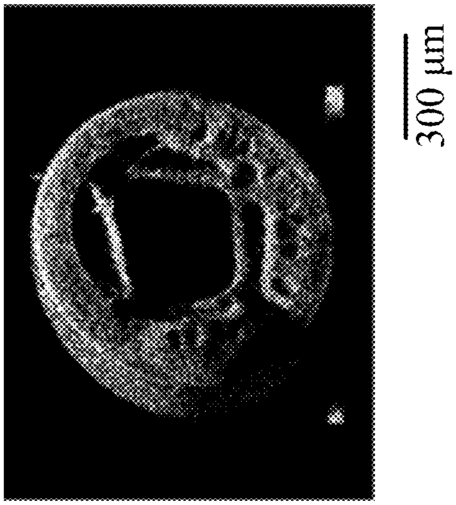
FIG. 3B is an EDS elemental mapping image of carbon element of Example 1 of the present disclosure.
Figure 3C:
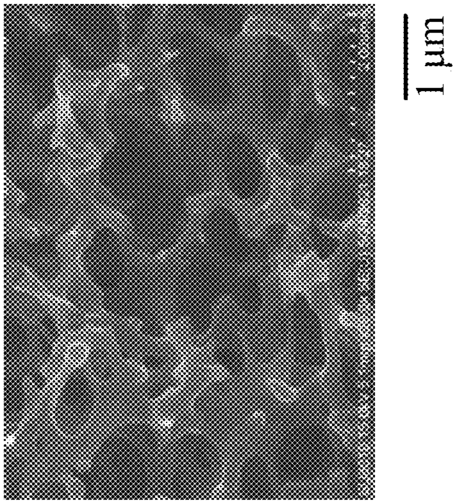
FIG. 3C is another SEM image of Example 1 of the present disclosure.

Please refer to FIGS. 3A to 3C. FIG. 3A is an SEM image of Example 1 of the present disclosure. FIG. 3B is an EDS elemental mapping image of carbon element of Example 1 of the present disclosure. FIG. 3C is another SEM image of Example 1 of the present disclosure. As shown in FIGS. 3A and 3B, the carbon element is distributed evenly, indicating that the polysulfone has been completely carbonized into the carbon. Further, as shown in FIGS. 3A and 3C, the analysis results of the SEM images under different magnifications show that after removing step, the macroscopic structure and the interconnected structure of Example 1 is intact and almost undamaged.

Figure 4A:
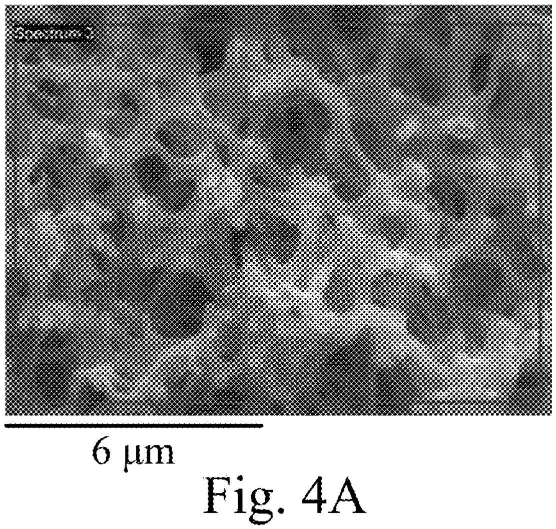
FIG. 4A is an SEM image of Example 2 of the present disclosure before the removing step.
Figure 4B:
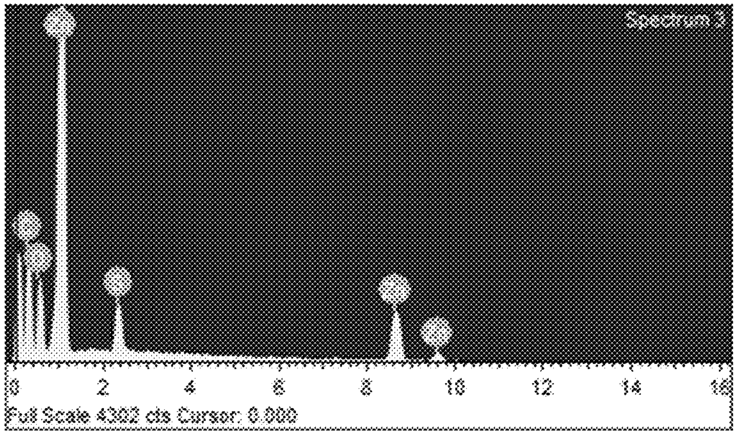
FIG. 4B is an image of EDS result of Example 2 of the present disclosure before the removing step.
Figure 4C:
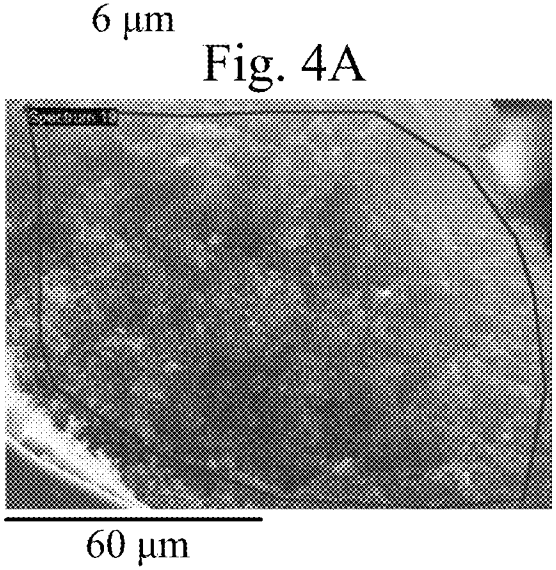
FIG. 4C is an SEM image of Example 2 of the present disclosure.
Figure 4D:
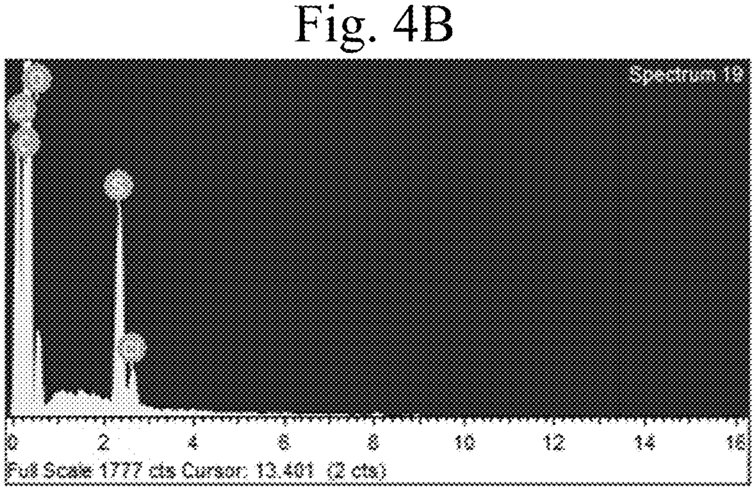
FIG. 4D is an image of EDS result of Example 2 of the present disclosure.

Please refer to FIGS. 4A to 4D. FIG. 4A is an SEM image of Example 2 of the present disclosure before the removing step. FIG. 4B is an image of EDS result of Example 2 of the present disclosure before the removing step. FIG. 4C is an SEM image of Example 2 of the present disclosure. FIG. 4D is an image of EDS result of Example 2 of the present disclosure. As shown in FIGS. 4A and 4C, after the removing step, the appearance of the interconnected structure of Example 2 is intact and almost undamaged. Further, as shown in FIGS. 4B and 4D, the zinc element has been effectively removed in the removing step, and the porous carbon material with high purity can be obtained.

Figure 5A:
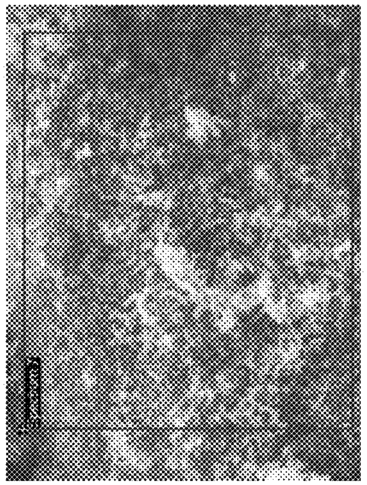
FIG. 5A is an SEM image of Example 3 of the present disclosure before the removing step.
Figure 5B:
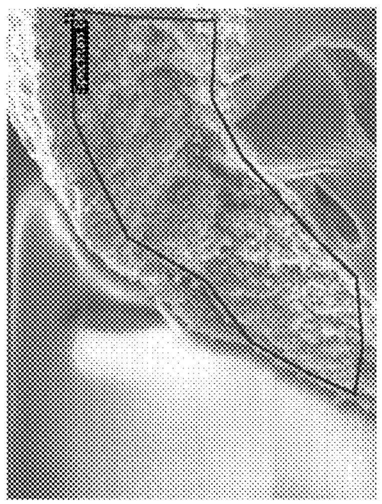
FIG. 5B is an SEM image of Example 3 of the present disclosure.
Figure 5C:
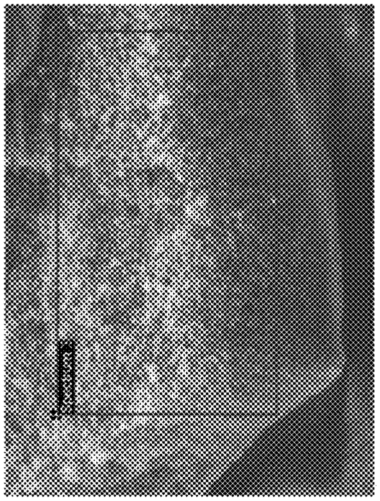
FIG. 5C is another SEM image of Example 3 of the present disclosure.
Figure 5D:
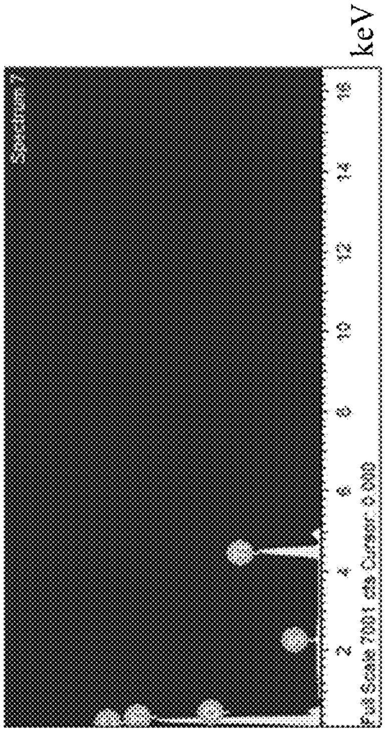
FIG. 5D is an image of EDS result of Example 3 of the present disclosure before the removing step.
Figure 5F:
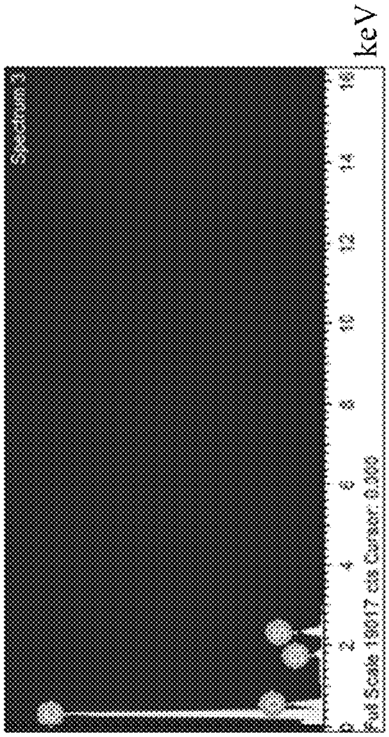
FIG. 5F is another image of EDS result of Example 3 of the present disclosure.
Figure 5E:
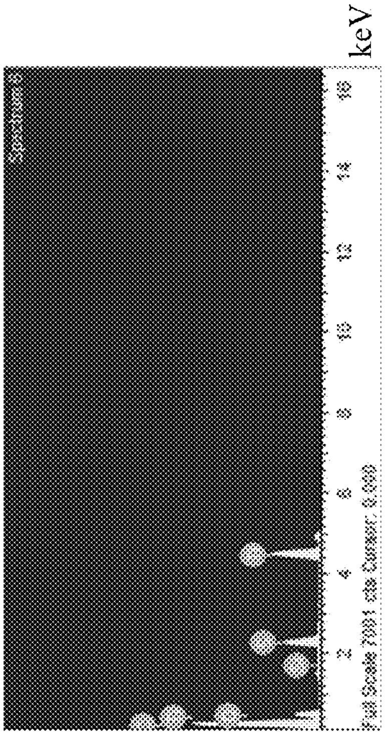
FIG. 5E is an image of EDS result of Example 3 of the present disclosure.

Please refer to FIGS. 5A to 5F. FIG. 5A is an SEM image of Example 3 of the present disclosure before the removing step. FIG. 5B is an SEM image of Example 3 of the present disclosure. FIG. 5C is another SEM image of Example 3 of the present disclosure. FIG. 5D is an image of EDS result of Example 3 of the present disclosure before the removing step. FIG. 5E is an image of EDS result of Example 3 of the present disclosure. FIG. 5F is another image of EDS result of Example 3 of the present disclosure. In detail, FIGS. 5A and 5D show the analysis results of the porous carbon composite material. FIGS. 5B and 5E show the analysis results of Example 3 after performing the removing step for 8 hours. FIGS. 5C and 5F show the analysis results of Example 3 after performing the removing step for 72 hours.

As shown in FIGS. 5A to 5C, after the removing step, the appearance of the interconnected structure of Example 3 is intact and almost undamaged. Further, as shown in FIGS. 5D to 5F, after performing the removing step for 72 hours, the titanium element has been effectively removed, and the porous carbon material with high purity can be obtained.

Figure 6A:
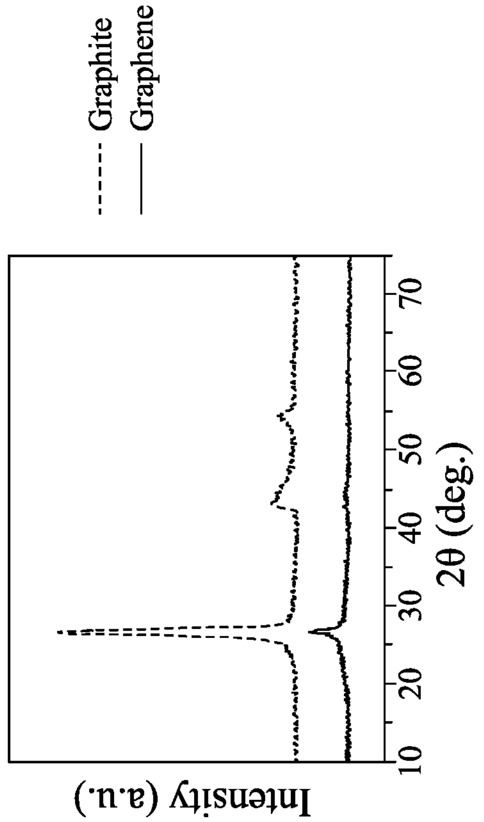
FIG. 6A is an XRD diffraction pattern of standard graphite and standard graphene.
Figure 6B:
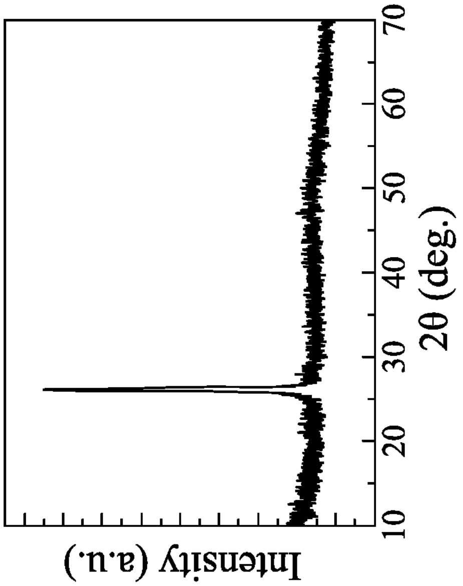
FIG. 6B is an XRD diffraction pattern of Example 4 of the present disclosure.
Figure 6C:
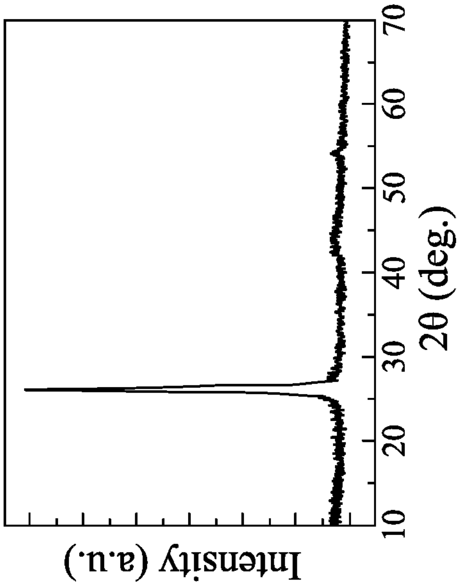
FIG. 6C is an XRD diffraction pattern of Example 5 of the present disclosure.
Figure 7A:
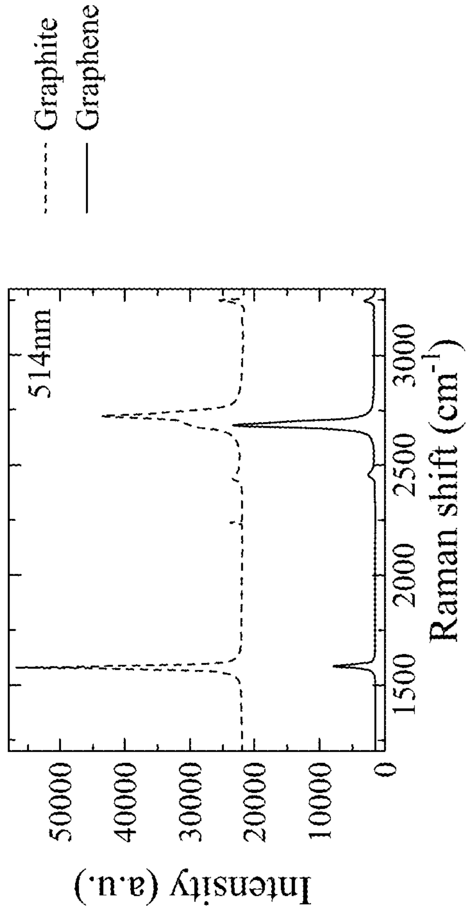
FIG. 7A is a Raman spectrum of standard graphite and standard graphene.
Figure 7B:
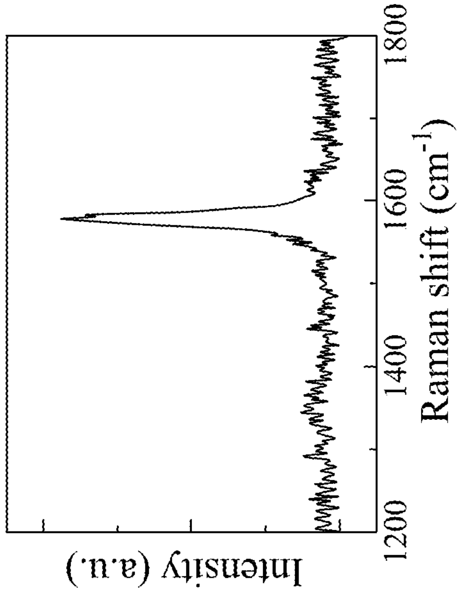
FIG. 7B is a Raman spectrum of Example 4 of the present disclosure.
Figure 7C:
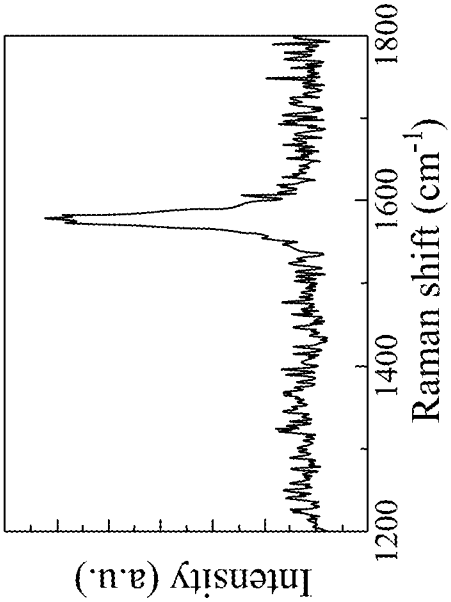
FIG. 7C is a Raman spectrum of Example 5 of the present disclosure.
Figure 8A:
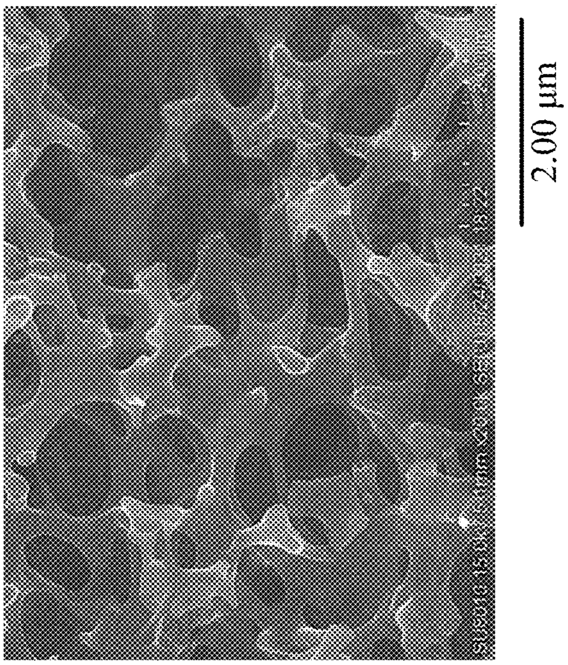
FIG. 8A is an SEM image of Example 4 of the present disclosure before the graphitizing step.
Figure 8B:
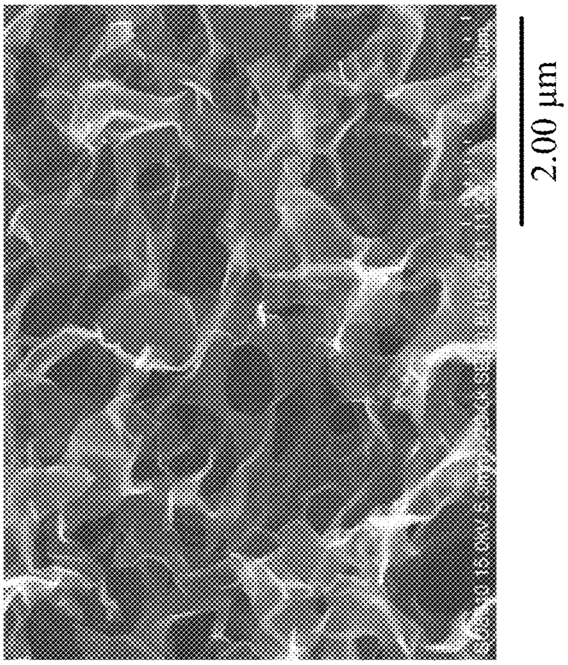
FIG. 8B is an SEM image of Example 4 of the present disclosure.
Figure 9A:
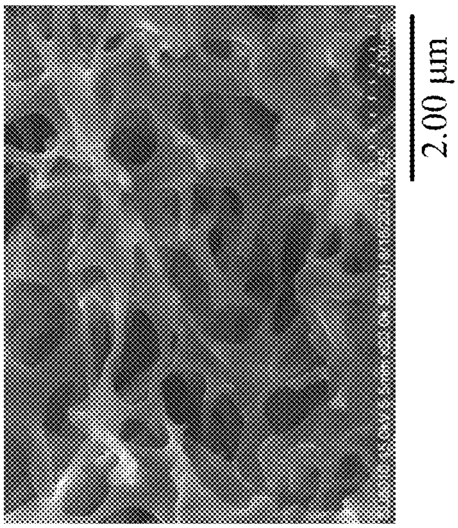
FIG. 9A is an SEM image of Example 5 of the present disclosure before the graphitizing step.
Figure 9B:
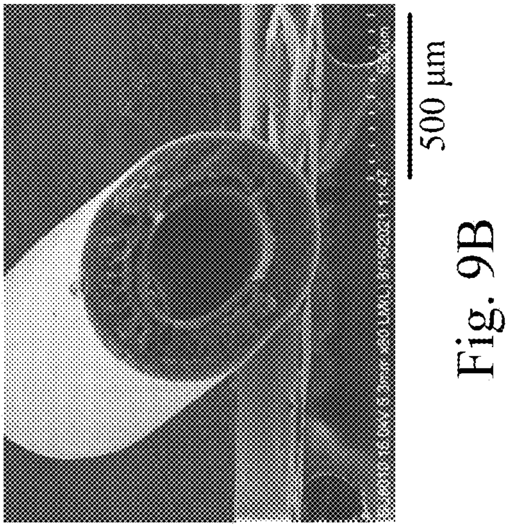
FIG. 9B is an SEM image of Example 5 of the present disclosure.
Figure 9C:
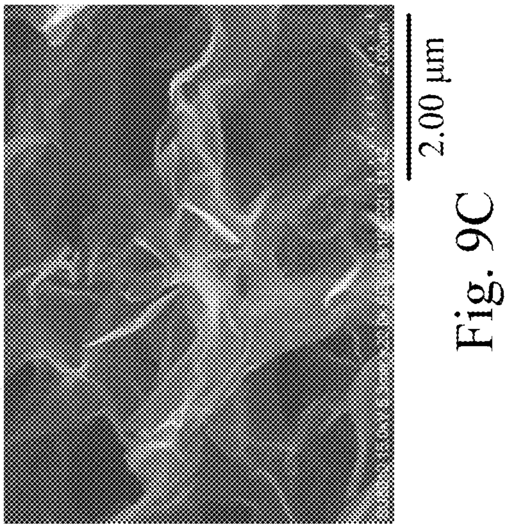
FIG. 9C is another SEM image of Example 5 of the present disclosure.

Please refer to FIGS. 6A to 9C. FIG. 6A is an XRD diffraction pattern of standard graphite and standard graphene. FIG. 6B is an XRD diffraction pattern of Example 4 of the present disclosure. FIG. 6C is an XRD diffraction pattern of Example 5 of the present disclosure. FIG. 7A is a Raman spectrum of standard graphite and standard graphene. FIG. 7B is a Raman spectrum of Example 4 of the present disclosure. FIG. 7C is a Raman spectrum of Example 5 of the present disclosure. FIG. 8A is an SEM image of Example 4 of the present disclosure before the graphitizing step. FIG. 8B is an SEM image of Example 4 of the present disclosure. FIG. 9A is an SEM image of Example 5 of the present disclosure before the graphitizing step. FIG. 9B is an SEM image of Example 5 of the present disclosure. FIG. 9C is another SEM image of Example 5 of the present disclosure.

As shown in FIGS. 6A to 7C, whether the polymer is polysulfone in Example 4 or is the polyimide in Example 5, the carbon therein can be transformed to graphite after the graphitizing step. Further, as shown in FIGS. 8A to 9C, after performing the graphitizing step, the appearance of the interconnected structure of Example 4 and Example 5 is intact and almost undamaged. It shows that the porous graphite material with high purity and high structural integrity can be manufactured by the manufacturing method of the porous graphite material of the present disclosure.

It can be seen from the above experimental analysis that in the manufacturing method of the porous carbon material and the manufacturing method of the porous graphite material of the present disclosure, the metal compound is coated on the polymer template so as to limit the deformation of polymer compound of the polymer template transforming to the carbon after the heating step. Therefore, the porous carbon material and the porous graphite material with high purity and high structural integrity can be obtained.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing statement, it is intended that the present disclosure covers modifications and variations of this disclosure provided they fall within the scope of the following claims.

What is claimed is:

1. A manufacturing method of a porous carbon material, comprising:

providing a polymer template, wherein the polymer template is a hollow fiber structure, the polymer template comprises a polymer compound, the polymer template has a plurality of pores, and the polymer template has an interconnected structure within a wall of the hollow fiber structure of the polymer template;

performing a coating step, wherein a metal compound is coated on the polymer template to form a transition intermediate;

performing a heating step, wherein the transition intermediate is heated to transform the polymer template to a carbon template and transform the metal compound to a coating layer, and a porous carbon composite material with a hierarchical structure is formed; and performing a removing step, wherein the coating layer is removed from the porous carbon composite material, and a porous carbon material is obtained.

2. The manufacturing method of the porous carbon material of claim 1, wherein the polymer compound is polyacrylonitrile, polyimide, cellulose or polysulfone.

3. The manufacturing method of the porous carbon material of claim 1, wherein the metal compound is a metal oxide.

4. The manufacturing method of the porous carbon material of claim 1, wherein in the coating step, an atomic layer deposition method or a sol-gel method is used to coat the metal compound on the polymer template.

5. The manufacturing method of the porous carbon material of claim 1, wherein a thickness of the metal compound coated on the polymer template is 1 Å to 2000 Å.

6. The manufacturing method of the porous carbon material of claim 1, wherein a thickness of the metal compound coated on the polymer template is 50 Å to 2000 Å.

7. The manufacturing method of the porous carbon material of claim 1, wherein the heating step has a heating temperature, and the heating temperature is 500° C. to 1000° C.

8. The manufacturing method of the porous carbon material of claim 1, wherein the heating step is performed under an ammonia atmosphere or an inert gas atmosphere.

9. The manufacturing method of the porous carbon material of claim 1, wherein in the removing step, the porous carbon composite material is immersed in a solution to remove the coating layer, and the solution is NaOH, KOH, $H_3PO_4$, HCl, $HNO_3$, HF or $H_2SO_4$.

10. A manufacturing method of a porous graphite material, comprising:

providing a porous carbon material manufactured by the manufacturing method of the porous carbon material of claim 1, wherein the porous carbon material is a hollow fiber structure, the porous carbon material has a plurality of mesopores, the porous carbon material has an interconnected structure within a wall of the hollow fiber structure of the porous carbon material, and a diameter of each of the mesopores is 2 nm to 50 nm; and performing a graphitizing step, wherein the porous carbon material is heated to a graphitization temperature to obtain a porous graphite material.

11. The manufacturing method of the porous graphite material of claim 10, wherein the graphitization temperature is 1600° C. to 3000° C.

12. The manufacturing method of the porous graphite material of claim 11, wherein in the graphitizing step the porous carbon material is heated at a rate of 1° C./min to 2° C./min.

* * * * *